United States Patent
Zhang et al.

(10) Patent No.: US 10,025,807 B2
(45) Date of Patent: Jul. 17, 2018

(54) DYNAMIC DATA ACQUISITION METHOD AND SYSTEM

(71) Applicant: Alibaba Group Holding Limited, George Town (KY)

(72) Inventors: Linfeng Zhang, Hangzhou (CN); Peng Huang, Hangzhou (CN); Xipu Wang, Hangzhou (CN); Wenbin Zheng, Hangzhou (CN)

(73) Assignee: Alibaba Group Holding Limited (KY)

( * ) Notice: Subject to any disclaimer, the term of this patent is extended or adjusted under 35 U.S.C. 154(b) by 624 days.

(21) Appl. No.: 14/022,634

(22) Filed: Sep. 10, 2013

(65) Prior Publication Data

US 2014/0074851 A1    Mar. 13, 2014

(30) Foreign Application Priority Data

Sep. 13, 2012    (CN) .......................... 2012 1 0339669

(51) Int. Cl.
*G06F 17/30*    (2006.01)
*G06Q 30/02*    (2012.01)

(52) U.S. Cl.
CPC ... *G06F 17/30339* (2013.01); *G06Q 30/0201* (2013.01)

(58) Field of Classification Search
None
See application file for complete search history.

(56) References Cited

U.S. PATENT DOCUMENTS

| | | |
|---|---|---|
| 5,946,678 A | 8/1999 | Aalbersberg |
| 6,012,053 A | 1/2000 | Pant et al. |
| 6,212,517 B1 | 4/2001 | Sato et al. |
| 6,675,159 B1 | 1/2004 | Lin et al. |
| 6,714,933 B2 | 3/2004 | Musgrove et al. |
| 7,505,969 B2 | 3/2009 | Musgrove et al. |
| 7,877,404 B2 | 1/2011 | Achan et al. |

(Continued)

FOREIGN PATENT DOCUMENTS

| | | |
|---|---|---|
| CN | 1629845 | 6/2005 |
| CN | 101158971 | 4/2008 |

(Continued)

OTHER PUBLICATIONS

Suenaga et al. "A study on Term Selection Measures and Applying to Medical Document Data" IPSJ Journal, Apr. 15, 2010, vol. 3, No. 2, pp. 108-118.

*Primary Examiner* — Ashish K Thomas
*Assistant Examiner* — Mellissa M Ohba
(74) *Attorney, Agent, or Firm* — Van Pelt, Yi & James LLP

(57) ABSTRACT

Acquiring dynamic data is disclosed including extracting a search term from a search request string that is received, looking up the search term in a threshold value dictionary to acquire a dynamic threshold score corresponding to the search term, using the search term as a query condition and the dynamic threshold score corresponding to the search term as a filter condition to acquire, in an index data table, one or more corresponding pieces of index information, acquiring data information corresponding to the search term based on the index information in the index data table, and sending the data information to be displayed in a page of a website. The dynamic threshold score varies based on a characteristic factor.

19 Claims, 9 Drawing Sheets

(56) References Cited

U.S. PATENT DOCUMENTS

| | | |
|---|---|---|
| 7,895,206 B2 | 2/2011 | Narayanan et al. |
| 8,396,742 B1 * | 3/2013 | Blume ............... G06Q 30/0256 |
| | | 705/14.1 |
| 2002/0078045 A1 | 6/2002 | Dutta |
| 2004/0143600 A1 | 7/2004 | Musgrove et al. |
| 2005/0131872 A1 | 6/2005 | Calbucci et al. |
| 2006/0004711 A1 | 1/2006 | Naam |
| 2007/0136256 A1 | 6/2007 | Kapur et al. |
| 2007/0174260 A1 | 7/2007 | Bachman et al. |
| 2007/0282827 A1 | 12/2007 | Levin |
| 2007/0288433 A1 | 12/2007 | Gupta et al. |
| 2008/0059458 A1 | 3/2008 | Byron |
| 2008/0097982 A1 | 4/2008 | Gupta |
| 2008/0104101 A1 * | 5/2008 | Kirshenbaum ... G06F 17/30539 |
| 2008/0172362 A1 | 7/2008 | Shacham et al. |
| 2008/0263009 A1 | 10/2008 | Buettner et al. |
| 2008/0313142 A1 | 12/2008 | Wang et al. |
| 2009/0059458 A1 | 3/2009 | Xu |
| 2010/0070484 A1 | 3/2010 | Kraft et al. |
| 2010/0138402 A1 | 6/2010 | Burroughs et al. |
| 2010/0153366 A1 | 6/2010 | Liu |
| 2011/0238657 A1 | 9/2011 | Hammond et al. |
| 2011/0314005 A1 | 12/2011 | Guo et al. |
| 2012/0078894 A1 * | 3/2012 | Jiang ................ G06F 17/30743 |
| | | 707/723 |
| 2012/0166277 A1 | 6/2012 | Gnanamani et al. |
| 2012/0221591 A1 | 8/2012 | Yerneni et al. |

FOREIGN PATENT DOCUMENTS

| | | |
|---|---|---|
| JP | H04262460 | 9/1992 |
| JP | H09101991 | 4/1997 |
| JP | 2005018530 | 1/2005 |
| WO | 2012018559 | 2/2012 |

* cited by examiner

450

500

700

DYNAMIC DATA ACQUISITION METHOD AND SYSTEM

CROSS REFERENCE TO OTHER APPLICATIONS

This application claims priority to People's Republic of China Patent Application No. 201210339669.4 entitled DYNAMIC ACQUISITION METHOD, DEVICE AND SYSTEM FOR DATA, filed Sep. 13, 2012 which is incorporated herein by reference for all purposes.

FIELD OF THE INVENTION

The present application relates to a dynamic data acquisition method and system.

BACKGROUND OF THE INVENTION

Conventionally, in implementing promotional platforms to display relevant products, users first perform bid processing on search terms in bid management server systems. When a search term is entered at a front-end search page of a website, product data information relating to the search term is displayed. Fixed threshold values are separately set up for the search term and for pieces of the product data information corresponding to the search term. The displayed results are static.

In a specific implementation process, a seller-user first selects keywords and promoted products corresponding to the keywords on a bid management server system. Subsequently, an algorithm module calculates correlations and obtains a correlation threshold score between a keyword and product data information. This calculated correlation threshold score is saved into a database. An engine server downloads the correlation threshold scores from the database and establishes an index database. After a user at a front-end client engages in a search using search terms, the threshold scores for product data information corresponding to the search terms are acquired from the index database, and the various threshold scores are compared with a preset static threshold value. Product data information having a threshold score greater than the static threshold score is selected for display. This filtering method is often overly simple and static because the filtering method treats all query words according to a uniform standard. As correlation threshold scores between keywords and product data information undergo dynamic changes, the filtering method often fails to produce more responsive and accurate search results.

In the above product data information method, the product data information that is displayed using the search term is often of poor quality and typically has a poor correlation with the search terms. In addition, the correlation of displayed promoted products with the search term may be worse than the result of a natural search. A search for a product on a website involves requests to two search engines (a product search engine and an ad search engine). The natural search refers to results from the product search engine, but the results of the ad search engine are displayed before the products that are found from the natural search, thus impacting user experience and click through rates.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
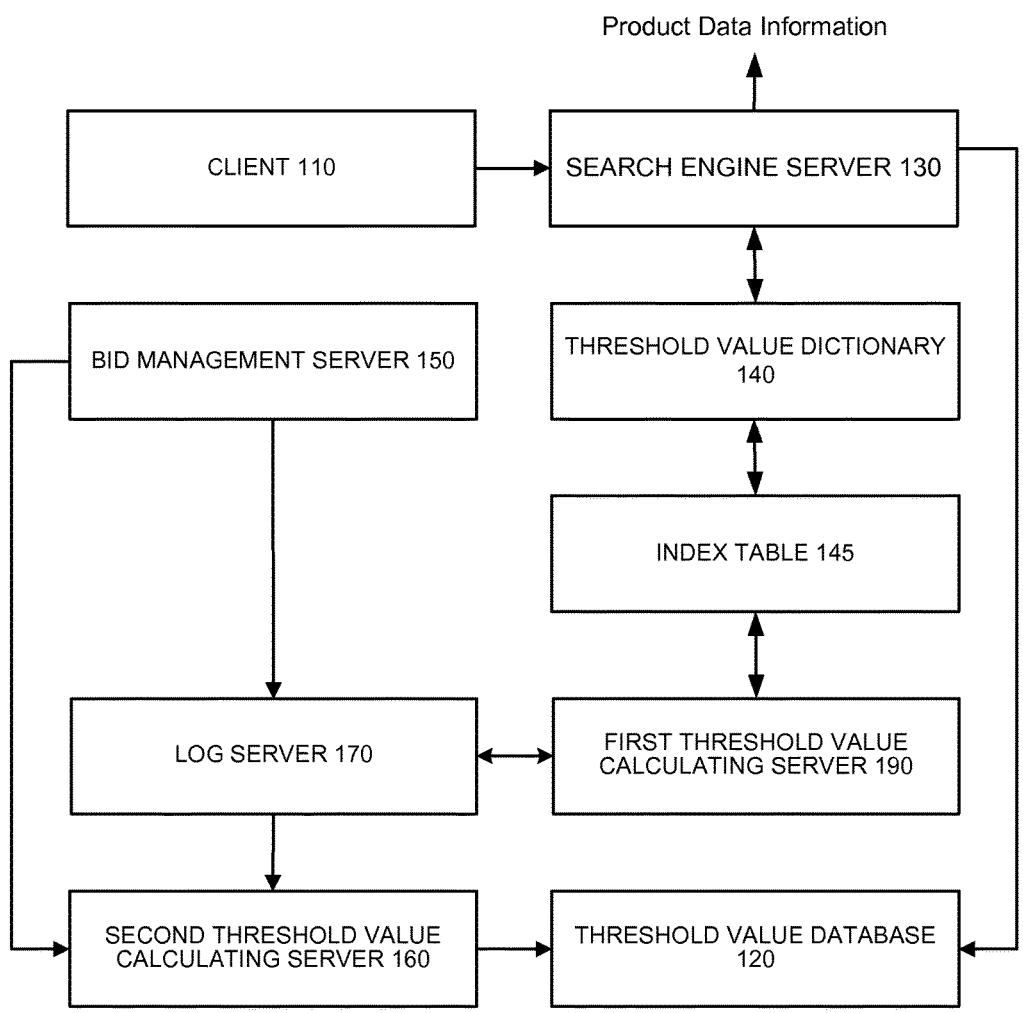
FIG. 1 is a structural diagram of an embodiment of a dynamic data acquisition system.
Figure 2A:
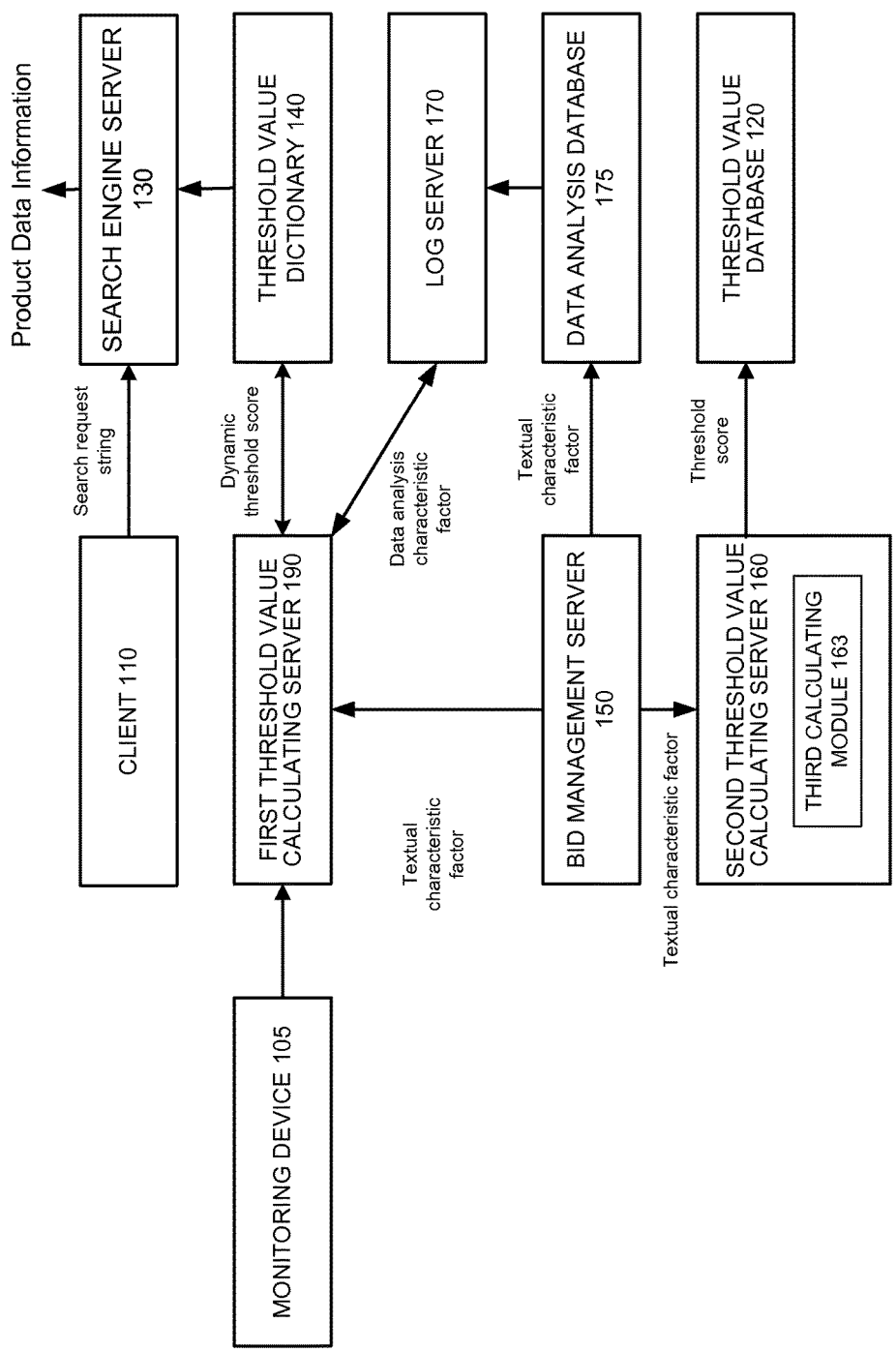
FIG. 2A is a detailed structural diagram of the embodiment of the dynamic data acquisition system of FIG. 1.

FIG. 1 is a structural diagram of an embodiment of a dynamic data acquisition system. FIG. 2A is a detailed structural diagram of the embodiment of the dynamic data acquisition system of FIG. 1.

Referring to FIG. 1, the dynamic data acquisition system 100 includes a client 110 and a search engine server 130.

The client 110 sends search request strings. The search engine server 130, which is connected to the client 110, receives the search request strings and reads search terms from the search request strings. After looking up the search terms in a threshold value dictionary to acquire dynamic threshold scores corresponding to the search terms, the search engine server 130 regards the search terms as query conditions and the dynamic threshold scores corresponding to the search terms as filter conditions for filtering an index data table. In some embodiments, the index data table is filtered based on the filter conditions to acquire one or more corresponding pieces of index information when keywords in the index data table and the search terms are the same and the threshold scores of the keywords are greater than or equal to the dynamic threshold scores of the search terms. A dynamic threshold score refers to different queries using different threshold scores for filtering. In other words, a threshold score is dynamically assigned to a query instead of the same threshold score being assigned to all queries for filtering. In some embodiments, the dynamic threshold scores vary based on characteristic factors, and the search engine server 130 acquires data information corresponding to the search terms based on the index information and sends the data information back to a front-end page of a website for display. In some embodiments, the threshold value dictionary includes search terms and a dynamic threshold score corresponding to each search term, the index data table includes keywords and threshold scores between keywords and each piece of data information, and the characteristic factors include textual characteristic factors and data analysis characteristic factors. In some embodiments, the threshold value dictionary is computed based on queries, product characteristics, and click through feedback to provide scores for an online search, and the threshold value dictionary is adjusted in real time. Each keyword has a score in the threshold value dictionary. Because the textual characteristic factors and data analysis characteristic factors change in real time as described above, the dynamic threshold scores also change in real time based on changes in the characteristic factors. The keywords described above correspond to the index words in an index data table. In other words, the keywords correspond to index information in the index data table.

Using the query q=mp3 player&score=1000~biggest integer, as an example. The search terms are read and sent to search engine. The score of 1000 filters out results that are not greater than 1000. The user searches for mp3 player, and the score 1000 is obtained from the dynamic threshold value dictionary. After the search engine receives the search terms, the search engine finds, from the index information, products that match mp3 player completely (both mp3 and player), filters the found products based on the products' threshold score, and returns all products with a score greater than or equal to 1000.

The search engine server 130 regards the dynamic threshold scores obtained using the search terms in the threshold value dictionary as the filter conditions for filtering the index data table. Because the dynamic threshold scores stored in the threshold value dictionary dynamically change based on real-time updates of the characteristic factors, the acquired data information corresponding to the current search terms is to be dynamically updated due to changes in the compared dynamic threshold score. The results that are ultimately displayed on the front-end web page of the website are also to be updated. Conventionally, a product data promotion method that is implemented on a search engine is inelastic and limited, resulting in unresponsive search results. Instead, the system 100 can achieve real-time, dynamic promotion of product data information.

In one example, the data information in the index data table described above is structured data information. Structured data means that product information stored on a website is structured. In other words, all of the data is stored in a database as individual fields, for example, title, summary, company name, price, and product property are all structured, and the search engine establishes indexes for the fields for search purposes. In some embodiments, the data information in the index data table includes product titles, product attributes, product company information, product-corresponding bid phrases, product-corresponding prices, product-bid phrase correlation scores, or any combination thereof. In some embodiments, the specific format of the index data table is similar to a search engine structure. Being similar to the search engine structure indicates that the structured data facilitates indexing for the search engine. The search engine uses the fields as indexes to perform a search and returns corresponding products. In some embodiments, the structure of the index data table corresponds to a structural form of an inverted index or a normal index.

The characteristic factors include textual characteristic factors, data analysis characteristic factors, or a combination thereof. In some embodiments, the textual characteristic factors include textual information matching parameters for the search terms and the products themselves, and the data analysis characteristic factors include the click rates of search terms, the click rates of the various corresponding products, the popularity of the search terms themselves, user promoted product area information, search term-bound product numbers (user numbers), other factors, or any combination thereof. The other factors include information mining of buyer and website promotional data, historical click through rate (CTR) information on website products, seller competitiveness, correlation of promoted products with phrases and comparison with natural search results, or any combination thereof. For example, the search term click rates and area information change according to actual conditions. Thus, the data analysis characteristic factors dynamically change and the dynamic threshold scores are updated in real time based on the dynamically changing data analysis characteristic factors.

In some embodiments, the dynamic threshold scores are calculated by a threshold value service in a processing server. In other words, the threshold value service uses the search terms and the characteristic factors already recorded in a log dictionary to perform threshold value calculations to obtain dynamic threshold scores. In addition, the threshold value service saves all the search terms and the dynamic threshold scores corresponding to the search terms in the threshold value dictionary as the filtering conditions for filtering. After the search engine server 130 receives the search requests sent by a client, the search engine server 130 then obtains the product data information corresponding to the current search terms. Because the characteristic factors recorded in the log dictionary include data analysis characteristic factors that may change in real time based on historical conditions, the calculated dynamic threshold scores also changes in real time. Consequently, the filtering conditions are adjusted based on the changes in the characteristic factors. Conventionally, the product data promotion method implemented on search engines is inelastic and limited, resulting in inflexible search results. On the other hand, the present application achieves dynamic promotion of product data information and provides flexible promotional data information results. In addition, because the data analysis characteristic factors include hit rates and other factors that embody search term quality, the accuracy of search results is increased.

In some embodiments, the client 110 sends the search request string to the search engine server 130. The search request string includes a plurality of sets of conditions. The search engine server 130 dissects the search request string, calls up the previously calculated dynamic threshold scores from the threshold value dictionary 140, and uses the obtained dynamic threshold scores as filter conditions for filtering keywords in an index data table. The search engine server 130 then sends back search result data and displays the search results on a browser application on the client 110 or searchweb. Searchweb refers to data returned to and displayed on the client.

In some embodiments, the system 100 includes a bid management server 150, a log server 170, and a first threshold value calculating server 190.

The bid management server 150 provides the textual characteristic factors.

The log server 170 stores the log dictionary to provide the data analysis characteristic factors, the textual characteristic factors, or a combination thereof.

The first threshold value calculating server 190 acquires the textual characteristic factors and the data analysis characteristic factors of the various search terms from the log dictionary and performs threshold value calculations based on the acquired textual characteristic factors and the acquired data analysis characteristic factors to acquire a dynamic threshold score for each search term. Subsequently, the first threshold value calculating server 190 saves the various search terms and the dynamic threshold score corresponding to each search term in a data dictionary format to the threshold value dictionary.

The textual characteristic factors include characteristic weights matched to the search terms and data information, and the data analysis characteristic factors are analytic parameter characteristic weights corresponding to the search terms.

In some embodiments, as shown in FIG. 2A, the first threshold value calculating server 190 extracts search terms and data information (including textual characteristic factors) corresponding to the search terms from the bid management server 150 and acquires log information following website completion of a search request from a log dictionary of the log server 170. In some embodiments, the log information is constructed from data analysis characteristic factors, textual characteristic factors, or a combination thereof obtained from the data analysis database 175. After the first threshold value calculating server 190 acquires the search terms and all of the textual characteristic factors and the data analysis characteristic factors, the first threshold value calculating server 190 calculates a dynamic threshold score for each search term.

For example, the first threshold value calculating server 190 calculates a correlation threshold value for each search term of a query and user-promoted products. At the same time, the first threshold value calculating server 190 calculates correlation threshold values for the search terms and the first 20 products of a website natural search results. In some embodiments, the natural search results refer to results from the product search engine or non-ad search engine. In addition to considering the textual characteristic factors for the search terms and the products and calculating the dynamic threshold scores, the calculation process also considers click through rates (CTR) of historical products, the popularity of the terms themselves, promoted product area information, term-bound product numbers (user numbers), other commercial factors, or any combination thereof to calculate second threshold scores, and finally obtaining dynamic threshold scores corresponding to the search terms based on first threshold scores and the second threshold scores. Text characteristic factors relate to product descriptions including title, summary, etc. The text characteristic factors relate to how word and product information are matched on the text. For example, if the user searches for mp3, the product description of products purchased by the user in connection with mp3 search has to be related to mp3 (for example, the product title includes mp3); otherwise the relationship would be considered not good. In some embodiments, other commercial factors include the popularity of the search term itself, a user's recommendation, product location information, product number/user number bound to search terms, etc. The first threshold value calculating server 190 also saves all of the search terms and the threshold scores of the search terms to a threshold value dictionary 140. In some embodiments, seller-users provide the textual characteristic factors through the bid management server 150 to the threshold value processing system 100. The textual characteristic factors are used to calculate correlation threshold scores for the search terms and the data information.

For example, a buyer using a front-end client browser application makes an online request for seller data information by entering a search term. For example, the buyer searches for the word "MP3." The browser application generates a search request string including the search term "MP3" to access the search engine server 130. After the search engine server 130 obtains the search request string, the search engine server 130 invokes an interface function of an algorithm to obtain a dynamic threshold score and a dynamic advertisement position number n. Then the score is used to re-write the filter conditions. For example: "product?q=MP3&filter=bidword.mlrScore: 9399999~2147483647&n=4," where "product?q" relates to data information (for example, product information), "MP3" relates to the search term, "filter" relates to the filter condition, "bidword.mlrScore" relates to the dynamic threshold score, and "n" relates to the advertisement position number. In some embodiments, the search engine server 130 internally reads from a database (DB) the correlation scores (mlrScores) between the products and the keywords on the website after they have been bound and establishes a specific index for the mlrScores. In some embodiments, the search engine server 130 dissects such a request string and sends back the data information which satisfies the filter conditions.

Figure 2B:
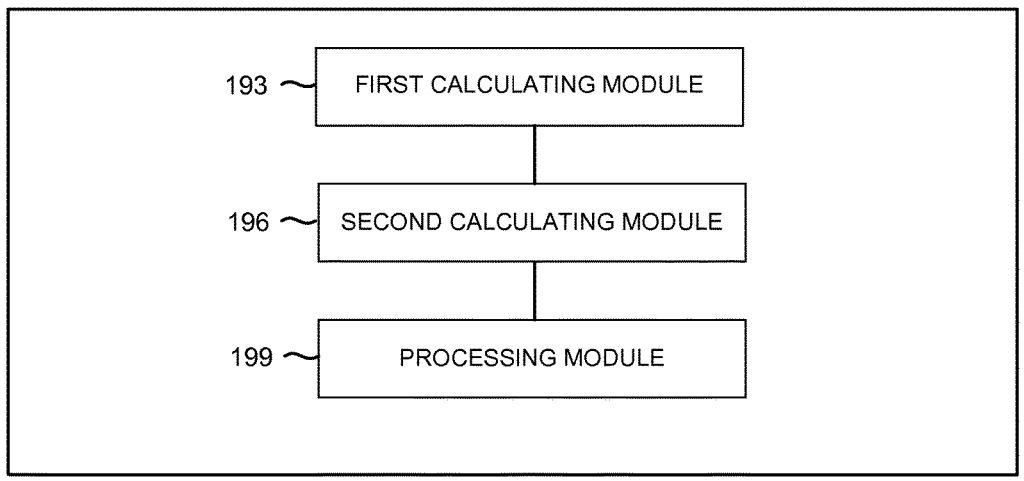
FIG. 2B is a structural diagram of an embodiment of a first threshold value calculating server.

FIG. 2B is a structural diagram of an embodiment of a first threshold value calculating server. In some embodiments, the first threshold value calculating server 190 includes a first calculating module 193, a second calculating module 196, and a processing module 199.

The first calculating module 193 employs a linear regression model, $Score_0=F0(f_1, f2, \ldots, fi)$, to perform fitting calculations to acquire a first threshold score for the search term, $Score_0$. fi corresponds to a textual characteristic factor corresponding to the search term, i corresponds to an integer less than or equal to N, and N corresponds to a natural number.

The second calculating module 196 employs a linear regression model, $Score_1=F1(f'_1, \ldots, f'_k)$, to perform fitting calculations to acquire a second threshold score for the search term, $Score_1$. $f'_k$ corresponds to a data analysis characteristic factor corresponding to the search term, k corresponds to an integer less than or equal to M, and M corresponds to a natural number.

The processing module 199 performs fitting calculations based on a linear regression model, $Score=F(score_0, score_1) \times p_1 \times p_2$, to acquire a dynamic threshold score for the search term. In some embodiments, $p_1$ corresponds to a duty cycle of the first threshold score and $p_2$ corresponds to the duty cycle of the second threshold score.

In some embodiments, the calculation of a textual correlation corresponding to the search terms and the products is based on the following factors: f1 corresponds to the ratio of the search term to the length of the same-word title in the product description, f2 corresponds to the ratio of the search term to the title containing the search term, f3 corresponds to the ratio of the search term to keywords containing the search term, f4 corresponds to the character match ratio for the search term and the title in the product description, and f5 corresponds to the character match ratio of the search term to the keyword series in the product description. In some embodiments, f4 and f5 consider not only character matching of the search term query and data information, but also character series matching. In other words, f4 is the order match ratio of the search term and the title in the product description, f5 is the order match ratio of the search term and the keywords of the product description, and f4 and f5 not only considers character matching of the search term and the product information, but also considers the character matching order. If the character series matches completely and the character series is entirely the same, then the final score gets the highest score; otherwise, the final score gets a score of 0. A linear regression model is employed for the fitting of these characteristics—in other words, for determining the characteristic value weights. The correlation score $Score_0=F0(f1, \ldots, f5)$, f1, f2, ..., f5 is based on the five factors. F0 corresponds to the model function trained by the linear regression model. The score ($Score_0$) obtained after the above characteristics are fitted corresponds to the correlation score.

Assuming the threshold score corresponding to the historical status of the search term corresponds to $Score_1=F1$ ($f'_1, \ldots, f'_k$), the historical status score of the keyword is similar to the correlation score in training and prediction. This function $Score=F(score_0, score_1) \times p_1 \times p_2$ fits the textual correlation score corresponding to the textual characteristic factor together with the historical status score of the keyword corresponding to the data analysis characteristic factor. This score is the ultimate score threshold value for the term and products. The score reflects the product textual match score and the commercial rules score. F similarly refers to a linear regression module.

In this example, system 100 also includes a second threshold value calculating server 160.

In response to receiving the search request string, the second threshold value calculating server 160 acquires, from a bid management server 150 or a log dictionary, keywords and textual characteristic factors of each piece of data information bound to the search terms. When the keywords and the search terms are the same in the index data table and the threshold scores of the keywords are greater than or equal to the dynamic threshold scores of the search terms, the second threshold value calculating server 160 performs threshold value calculations based on the textual characteristic factors to acquire one or more threshold scores corresponding to each search term, and thereafter saves the various keywords and a threshold score corresponding to each keyword to a threshold value database 120. In some embodiments, the functions implemented by the second threshold value calculating server 160 are incorporated into the bid management server 150. In other words, the bid management server 150 performs the threshold value calculations based on the textual characteristic factors to acquire the threshold values for each keyword.

In some embodiments, the binding relationships between the keywords and the data information are preset in the background. For example, binding relationships with different products are established for the same keyword. The textual characteristic factors for keywords and the data information in each binding relationship are sent to the bid management server 150 for threshold value calculations. The threshold scores between keywords and each product related to each keyword are acquired. All of the acquired threshold scores are saved in a threshold value database 120. Before the search engine server 130 begins a search action, the search engine server 130 creates an index table based on the threshold scores in the threshold value database 120. In some embodiments, when, in the early stage of searching, the client 110 sends a search request to the search engine server 130, the search engine server 130 considers the previously calculated dynamic threshold scores which corresponds in the threshold value dictionary 140 to the search term as the filter conditions for filtering in the index table index to acquire information corresponding to the search term based on whether the threshold score is greater than or equal to the dynamic threshold score. In other words, only data information corresponding to threshold scores that exceed the dynamic threshold scores is the data information which complies with the search term filtering conditions.

In some embodiments, the second threshold value calculating server 160 of FIG. 2A includes a third calculating module 163.

The third calculating module 163 employs a linear regression model, $Score'=F'(f1, f2, \ldots, fj)$, to perform fitting calculations to acquire threshold scores for the keyword. fj corresponds to the textual characteristic factors corresponding to the keyword, j corresponds to an integer less than or equal to J, and J corresponds to a natural number.

In some embodiments, after the search engine server 130 receives search terms, the search engine server 130 invokes a dynamic database interface program for calculating threshold values. In addition, the dynamic threshold scores corresponding to the search terms are acquired from the threshold value dictionary. The search engine server 130 then sends back dynamic threshold scores corresponding to the received search terms. The dynamic threshold scores currently support self-adaption for different PIDs (Page IDs) used to identify different areas on website pages). After the search engine server 130 obtains the dynamic threshold scores for the calculated search terms, the dynamic threshold scores (the filter conditions) are combined with the request string. Then the combined request string is compared to threshold scores in an index table that was previously established. Thus, promotional data information corresponding to the threshold scores which are less than the dynamic threshold scores is not displayed. In some embodiments, the maximum number of positions in which products that meet threshold value filters are displayed is less than or equal to the position limit dynamically calculated by an algorithm module. By limiting the maximum number of positions, an impact from website natural searches is minimized. For example, a website's space for displaying ads is limited so that the ad space does not significantly impact the natural search results or the non-ad search results. Thus, in some embodiments, the algorithm module returns an upper limit of ads for display to make sure that most ads for the product does not exceed the upper limit. In other words, the maximum number of positions is used to avoid displaying too many ads.

As an example, a seller-user selling electronic products is used to explain a business process flow whereby dynamic threshold scores are acquired. First, the seller-user selects the keyword "MP3" on the bid management server 150 in order to engage in bidding. The bid management server 150 then sets up 500 products being sold by the seller-user for the keyword "MP3" to serve as data information that the user is promoting. For example, the seller-user binds 500 products with respect to the term mp3. In other words, a search for mp3 returns the 500 products. Thus, 500 different pieces of data information are bound to the same keyword "MP3." In some embodiments, the correlation between the 500 pieces of data information and "MP3" vary. The bid management server 150 sends the keyword "MP3" and the 500 binding relationships (keyword and data information) in the form of a request (for example, the uniform resource locator (URL) request string of a hypertext transfer protocol (HTTP)

server) to the first threshold value calculating server 190 to access the threshold value service. In some embodiments, the threshold value service calculates the threshold score for each binding relationship. In some embodiments, the threshold score is used to determine the magnitude of the correlation between the keyword "MP3" and each piece of data information. Further, the first threshold value calculating server 190 calculates a threshold value by reading the log information in the log server 170 and thus obtains the threshold scores of the textual correlations of the keyword "MP3." In the next stage, the threshold scores are sent back to the bid management server 150, and the bid management server 150 sends the threshold scores to the threshold value database (DB) where they are saved. Accordingly, the threshold scores are provided to search engine services to reduce the utilization of resources from useless data in the online system.

In some embodiments, the system 100 includes a monitoring device 105.

The monitoring device 105 receives real-time messages to monitor the consistency of the log dictionary and updates the log dictionary upon detecting that the characteristic factors have changed. The monitoring device 105 refers to a set of real-time information update notification systems. After the user's product information is modified, the monitoring device 105 modifies, in real-time, the threshold value dictionary, since the website's data is changing and user behavior is also changing. Thus, the monitoring device 105 makes sure that information in the threshold value dictionary changes in real time so that threshold values are more realistic. In some embodiments, the monitoring device 105 sends real-time notification messages. For example, on the bid management server 150, the seller-user modifies the data information or adds products to the data information. The monitoring device 105 captures a related action and converts the related action into a message. Then, the monitoring device 105 transmits a corresponding change-of-field information or new data entry information to the search engine server 130 for updating of the index data table. Thus, the threshold value index data table is to be updated in real time based on website promotional activity information, user real-time browsing actions and click information, click through rates for promoted products, and other such information. Consequently, the displayed threshold value for each search term query is adjusted in real time, without manual intervention being required and total calculations. In some embodiments, the system 100 gives a default value for a new keyword query if the log dictionary does not have the new keyword.

In some embodiments, the log dictionary index data that the system provides the search engine server 130 and the bid management server 150 is to remain the same. As an example, the system verifies file size, file md5 value, disk capacity, and other such data after the real-time notification messages have been sent. If the system finds an inconsistent and abnormal situation (for example, insufficient disk capacity and only a portion of the data has been transmitted), the system issues an alarm indicating that the matter be handled manually. For example, a centrally managed task used to synchronize dictionary data exists. The task entails multi-party distribution of dictionary data at a certain time every day, including md5 value verification of the distributed dictionaries. The system first confirms that the transmitted dictionaries are new and the same before the system performs subsequent processing. If the system finds an inconsistency, the system issues an alarm calling for manual intervention and repair. In addition, in some embodiments, synchronous additions and updating are performed in tandem with website data changes. Otherwise, a problem may occur in that the term binding obtained by the user in the background system differs from what is displayed and sent back by the search engine server 130. For example, a product that a user obtained with a term on a promotion platform is of superior quality, and the user believes that the product is exposed. However, the search engine filters the product out and never provides the product an exposure opportunity. Similar products that appear are different. Thus, to implement consistency in the data of the log dictionary is to implement some verification tasks. The verification tasks stop the process flow; otherwise, inconsistent data in the log dictionary would lead to user complaints.

As an example, after the user sets up the textual characteristic factors between the advertised products to be promoted and the keywords on the bid management server 150, the bid management server 150 requests a threshold value service with a keyword query, and obtains the corresponding correlation threshold value information. The bid management server 150 then assesses the binding relationships and superior status of these keywords and data information based on the threshold value information. When the seller-user discovers that the products bound do not have highly effective exposure opportunities, the seller-user will optimize product information and promotion schemes of their products on the bid management server 150. The seller-user also decides on a promotional strategy based on the intensity of the promotional competition for different keywords and improves product promotion quality for the entire website, to develop a positive long-term business.

Although separate servers 190, 150, 160 and 130 are shown in this and other examples for purposes of illustration, in various embodiments, the functions of two or more servers may be combined and performed by a single server.

Figure 3:
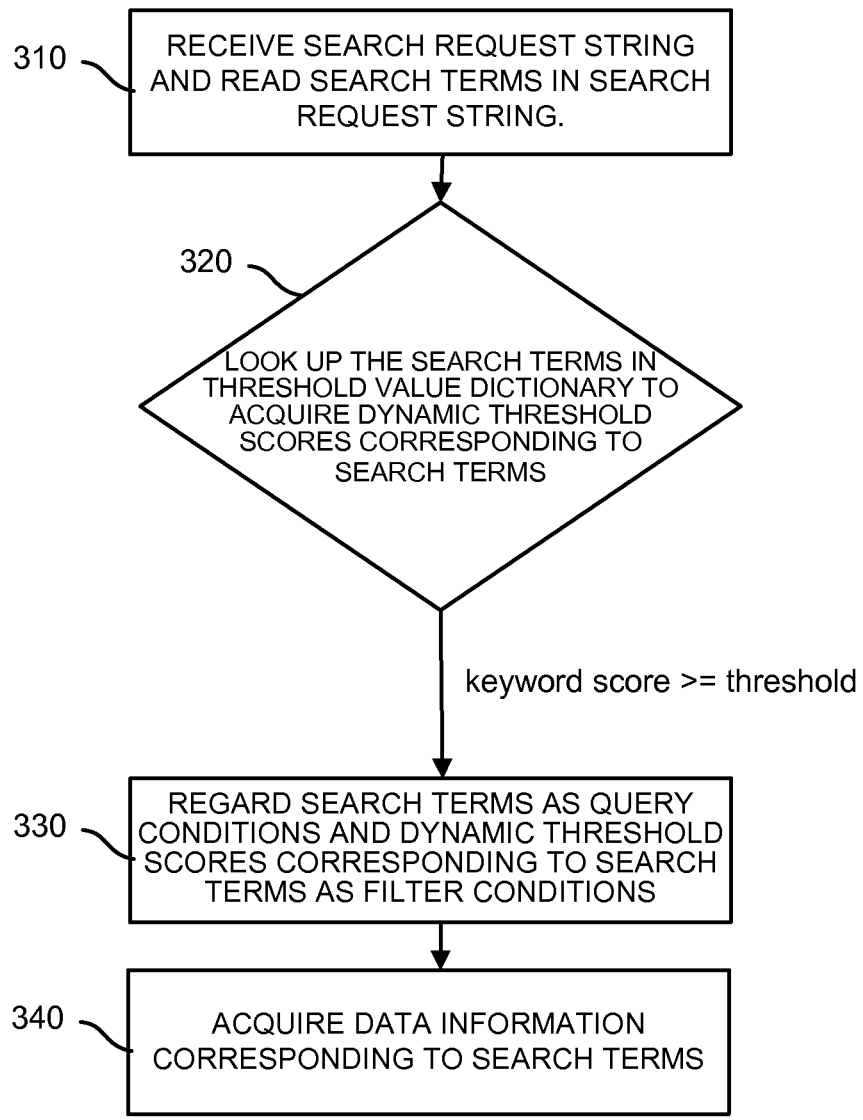
FIG. 3 is a flow chart of an embodiment of a dynamic data acquisition method.

FIG. 3 is a flow chart of an embodiment of a dynamic data acquisition method. In some embodiments, the method 300 is implemented by the search engine server 130 of FIG. 1 and includes:

In 310, the search engine server 130 receives a search request string and reads search terms in the search request string.

In 320, the search engine server 130 looks up the search terms in a threshold value dictionary to acquire dynamic threshold scores corresponding to the search terms. In some embodiments, a dynamic threshold value interface function is used to acquire dynamic threshold scores from the threshold value dictionary.

In 330, the search engine server 130 regards the search terms as query conditions and the dynamic threshold scores corresponding to the search terms as filter conditions for filtering an index data table to acquire one or more corresponding pieces of index information in the event that keywords and the search terms are the same and threshold scores of the keywords are greater than or equal to the dynamic threshold scores of the search terms. In some embodiments, the dynamic threshold scores vary according to characteristic factors. The keywords are index words in the index data table, and the keywords correspond to the index information.

In 340, the search engine server 130 acquires data information corresponding to the search terms based on the index information and sends the data information back to a front-end page of a website for dynamic display. In some embodiments, the threshold value dictionary includes search terms and the dynamic threshold score corresponding to each search term and the index data table includes keywords and threshold scores between keywords and each piece of data information, and the characteristic factors include textual characteristic factors and data analysis characteristic factors that change in real time.

In some embodiments, the dynamic threshold scores obtained from the threshold value dictionary using the search terms are used as the filter conditions for filtering in the index data table. Since the dynamic threshold scores stored in the threshold value dictionary vary dynamically based on real-time changes of the characteristic factors, the data information corresponding to the acquired current search term is dynamically updated because of changes in the dynamic threshold scores. Therefore, the results that are ultimately displayed on the front-end page of the website are also to be updated. Conventionally, product data promotion method implemented on search engines is inelastic and limited, resulting in unresponsive search results. On the other hand, the present application achieves dynamic promotion of product data information in real time.

In some embodiments, the characteristic factors include textual characteristic factors and data analysis characteristic factors. The textual characteristic factors include matching parameters for the search terms and textual information of the products themselves. The data analysis characteristic factors includes the click rates of search terms, the click rates of the various corresponding products, the popularity of search terms themselves, user promoted product area information, search term-bound product numbers (user numbers), and other such factors (for example, information mining of buyer and website promotional data, historical CTR information on website products, seller competitiveness, correlation of promoted products with phrases and comparison with natural search results, etc.). For example, the search term click rates and area information change dynamically according to actual conditions. Thus, the data analysis characteristic factors are dynamic and changing and thus the dynamic threshold scores are updated in real-time based on dynamically changing the data analysis characteristic factors.

As an example, the client 110 sends a search request string to the search engine server 130. The search request string is assembled from multiple conditions. The search engine server 130 dissects the search request string, calls up the previously calculated dynamic threshold scores from the background threshold value dictionary 140, and uses the obtained dynamic threshold scores as filter conditions for filtering keywords in an index table 145. The search engine server 130 then sends back search result data and ultimately displays the search results on the browser application of the client 110.

Figure 4A:
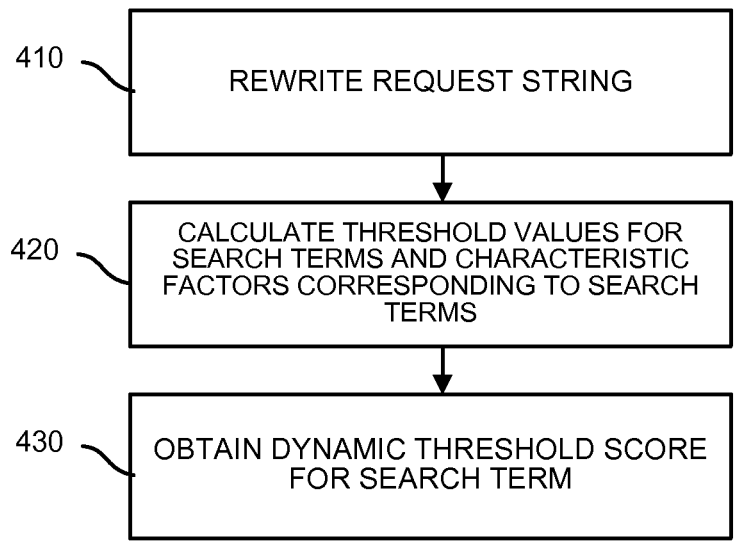
FIG. 4A is a flow chart of an embodiment of a dynamic threshold score look up method.

FIG. 4A is a flow chart of an embodiment of a dynamic threshold score look up method. In some embodiments, the method 400 is an implementation of 320 of FIG. 3 and includes:

In 410, after the search engine server 130 receives a search request string from the client 110, the search engine server 130 rewrites the request string.

In 420, the search engine server 130 then invokes the dynamic threshold value interface processing class::init, in a background algorithm module, having the threshold value calculating server to calculate the threshold values for the search terms in the request string and the characteristic factors corresponding to the search terms in the log dictionary.

In 430, based on the calculated threshold values for the search terms in the request string and the characteristic factors, the search engine server 130 obtains a dynamic threshold score for the search term. The dynamic threshold scores represent a dynamic comprehensive correlation between the keywords and the data information. In some embodiments, the dynamic threshold scores are added to a filter condition. Moreover, the results that are returned are rewritten. The rewritten request strings are used to request that the search engine server 130 kernel query module complete the query tasks and send back the corresponding search results to the browser application of the client 110 for display.

Figure 4B:
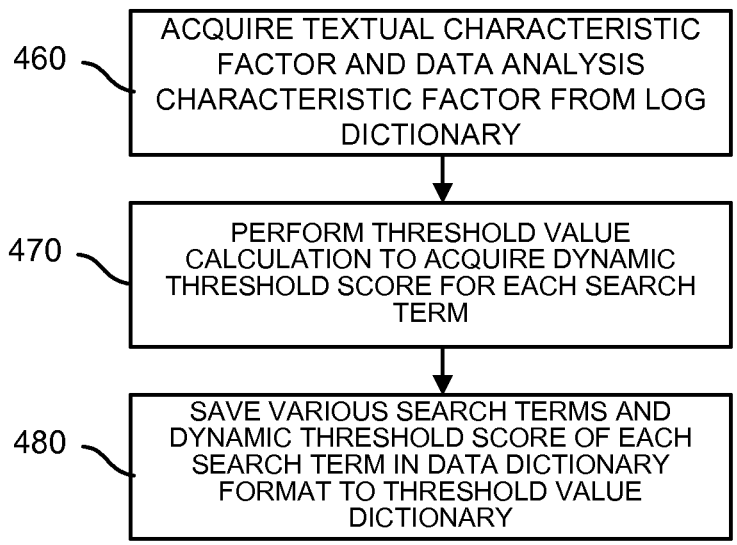
FIG. 4B is a flow chart of an embodiment of a dynamic threshold score computation method.

FIG. 4B is a flow chart of an embodiment of a dynamic threshold score computation method. In some embodiments, the method 450 is implemented before 320 of FIG. 3 and includes:

In 460, the search engine server 130 acquires textual characteristic factors and data analysis characteristic factors from a log dictionary.

In 470, the search engine server 130 performs threshold value calculations based on the textual characteristic factors and the data analysis characteristic factors to acquire a dynamic threshold score for each search term.

In 480, the search engine server 130 saves the various search terms and the dynamic threshold score of each search term in a data dictionary format to the threshold value dictionary. In some embodiments, the textual characteristic factors correspond to characteristic weights matched to the search terms and data information and the data analysis characteristic factors correspond to analytic parameter characteristic weights corresponding to the search terms.

In an example, the first threshold value calculating server 190 extracts search terms and data information corresponding to the search terms from the bid management server 150 and acquires log information following website completion of a search request from a log dictionary of the log server 170. In some embodiments, the log information is constructed from data analysis characteristic factors and textual characteristic factors obtained from the data analysis database 175. After the first threshold value calculating server 190 acquires the search terms and the textual characteristic factors and data analysis characteristic factors, the first threshold value calculating server 190 calculates the dynamic threshold score for each search term. For example, the first threshold value calculating server 190 calculates the correlation threshold value for each search term of a query and user-promoted products. At the same time, the first threshold value calculating server 190 calculates the correlation threshold values for the search terms and the first 20 products of the website natural search results. In addition to taking into account the correlation threshold values for the search terms and the products and calculating dynamic threshold scores as described above, the calculation process also takes into account using click through rates of historical products, the popularity of the terms themselves, promoted product area information, term-bound product numbers (user numbers), and other commercial factors to calculate second threshold scores, and finally obtains the dynamic threshold scores corresponding to the search terms based on the first threshold scores and the second threshold scores. The first threshold value calculating server 190 also saves all the search terms and their threshold scores to a threshold value dictionary. In some embodiments, seller-users provide textual characteristic factors, which are used to calculate correlation threshold scores for search terms and data information, through the bid management server 150 to the first threshold value calculating server 190.

Figure 5:
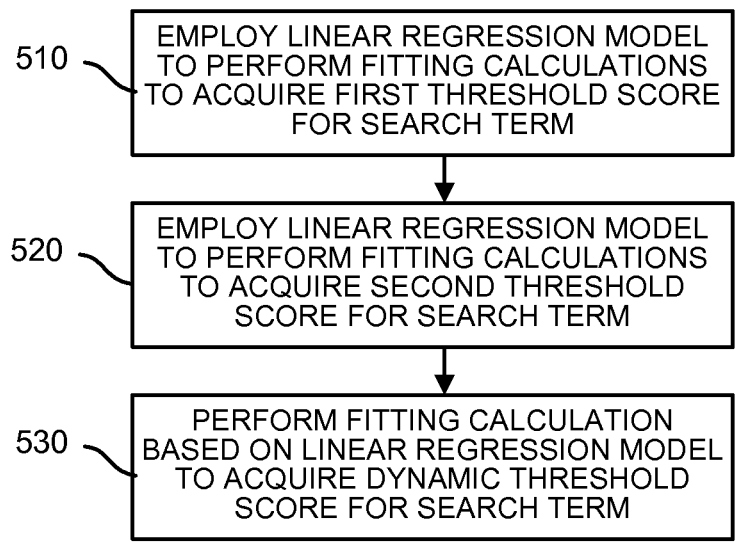
FIG. 5 is a flow chart of an embodiment of a dynamic threshold score acquiring method.

FIG. 5 is a flow chart of an embodiment of a dynamic threshold score acquiring method. In some embodiments, the method 500 is an implementation of 470 of FIG. 4B and comprises:

In 510, the search engine server 130 employs a linear regression model, $Score_0=F0(f_1, f2, \ldots, fi)$, to perform fitting calculations to acquire a first threshold score for the search term, $Score_0$. fi corresponds to a textual characteristic factor corresponding to the search term, i corresponds to an integer less than or equal to N, and N corresponds to a natural number.

In 520, the search engine server 130 employs a linear regression model, $Score_1=F1(f'_1, \ldots, f'_k)$, to perform fitting calculations to acquire a second threshold score, $Score_1$, for the search term. $f'_k$ corresponds to the data analysis characteristic factor corresponding to the search term, k corresponds to an integer less than or equal to M, and M corresponds to a natural number.

In 530, the search engine server 130 performs fitting calculations based on a linear regression model, $Score=F(score_0, score_1) \times p_1 \times p_2$, to acquire the dynamic threshold score for the search term. $p_1$ corresponds to the duty cycle of the first threshold score and $p_2$ corresponds to the duty cycle of the second threshold score.

In one example, the factors taken into account in textual correlation calculations corresponding to search terms and products include: f1 corresponds to the ratio of the search term to the length of the same-word title in the product description, f2 corresponds to the ratio of the search term to the title containing the search term, f3 corresponds to the ratio of the search term to keywords containing the search term, f4 corresponds to the character match ratio for the search term and the title in the product description, and f5 corresponds to the character match ratio of the search term to the keywords series in the product description. In some embodiments, f4 and f5 consider not only character matching of the search term of the query and data information, but also character series matching. If the character series matches completely and the character series is entirely the same, then f4 and f5 gets the highest score; otherwise, f4 and f5 gets a score of 0. A linear regression model is used for the fitting these characteristics—in other words, for determining the characteristic value weights. In the correlation score $Score_0=F0(f1, \ldots f5)$, f1, f2, $\ldots$, f5 indicate these five characteristics, and F0 indicates the model function trained by the linear regression model. The score ($Score_0$) obtained after the above characteristics are fitted is the correlation score.

Assuming that the threshold score corresponds to the historical status of the search term: $Score_1=F1(f'_1, \ldots, f'_k)$, the threshold value corresponding to the historical status of the search term is similar to the correlation score in training and prediction.

This function $Score=F(score_0, score_1) \times p_1 \times p_2$ fits the textual correlation score corresponding to the textual characteristic factor together with the historical status threshold score of the keyword corresponding to the data analysis characteristic factor. The score is the ultimate score threshold value for the term and products. The score reflects the product textual match score and the commercial rules score. F refers to a linear regression module.

Figure 6:
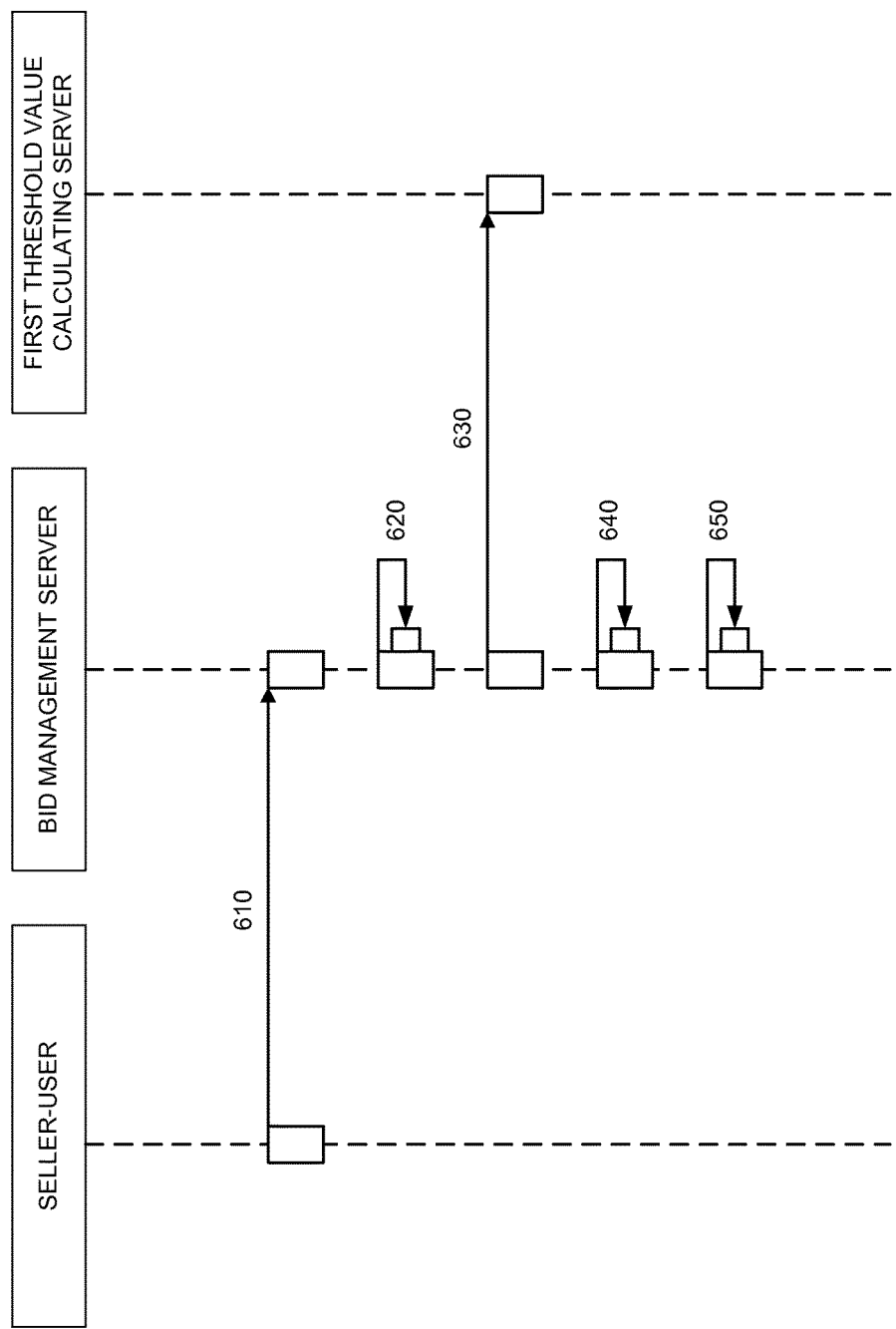
FIG. 6 is a business service flow chart of an embodiment of a bid management process.

FIG. 6 is a business service flow chart of an embodiment of a bid management process. In some embodiments, the process is implemented by a bid management server 150 of FIG. 1 and includes:

In 610, a seller-user sets up promotional information on the bid management server 150. The promotional information includes a list relating keywords to be promoted and data information.

In 620, the bid management server 150 sets up match parameters for the keywords and textual information on the products themselves and acquires the promotional information.

In 630, the bid management server 150 sends the promotional information to a first threshold value calculating server 190. After the first threshold value calculating server 190 receives textual characteristic factors and data analysis characteristic factors for various search terms from a log dictionary, the first threshold value calculating server 190 performs threshold value calculations based on the textual characteristic factors and the data analysis characteristic factors to acquire a dynamic threshold score for each search term. The first threshold value calculating server 190 then saves the various search terms and the dynamic threshold score of each search term in a data dictionary format to the threshold value dictionary. In some embodiments, the textual characteristic factors are characteristic weights matched to the search terms and data information and the data analysis characteristic factors are analytic parameter characteristic weights corresponding to the search terms.

In 640, the bid management server 150 makes threshold score-based queries in the first threshold value calculating server 190 to acquire preset binding results. The binding results are correlations scores between each search term and the product information.

In 650, the bid management server 150 assembles product information corresponding to the search terms.

Prior to regarding the search terms as query conditions and the dynamic threshold scores corresponding to the search terms as filter conditions for conducting queries in an index data table, the first threshold value calculating server 190 acquires from a bid management server or log dictionary of a background client keywords and the textual characteristic factors of the data information of product bound to the keywords, performs threshold value calculations based on the textual characteristic factors to acquire one or more threshold scores corresponding to each keyword, saves the various keywords and the one or more threshold scores corresponding to each keyword to the threshold value database, creates the index table based on each keyword in the threshold value database and the threshold score corresponding thereto. In some embodiments, the second threshold server 160 performs the threshold value calculations based on the textual characteristic factors to acquire one or more threshold scores corresponding to each keyword including employing a linear regression model, $Score'=F'(f1, f2, \ldots, fj)$, to perform fitting calculations and to acquire threshold scores for the keywords. fj is the textual characteristic factor corresponding to a keyword, j is an integer less than or equal to J, and J is a natural number.

Prior to receiving a request string and reading search terms in the search request string, the first threshold value calculating server 190 receives real-time messages to monitor the consistency of the log dictionary from the client 110 or a user's bid platform, and updates the log dictionary upon detecting that the characteristic factors have changed.

Figure 7:
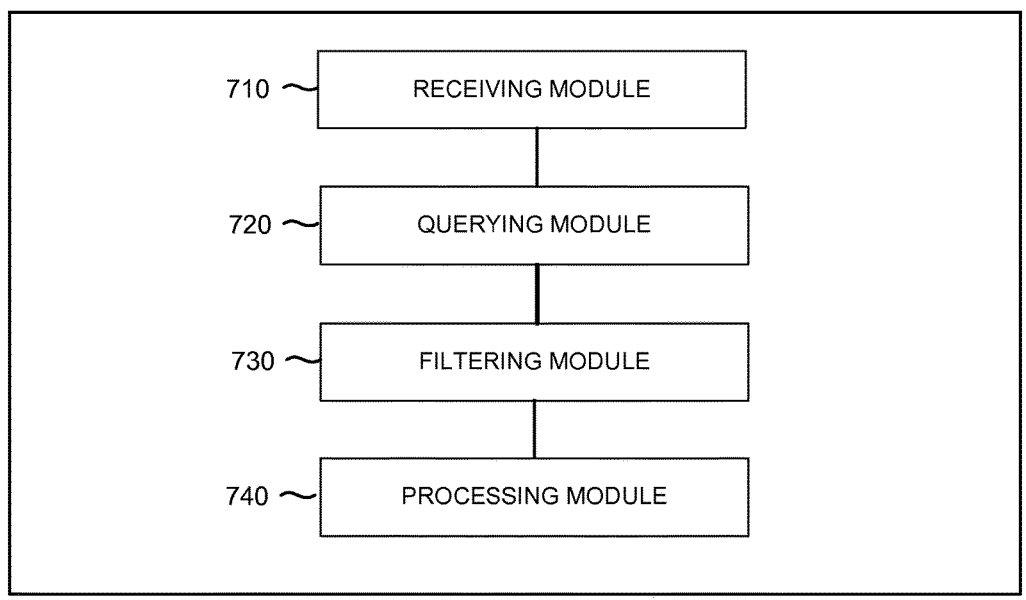
FIG. 7 is a structural diagram of an embodiment of a dynamic data acquisition system.

FIG. 7 is a structural diagram of an embodiment of a dynamic data acquisition system. In some embodiments, the system 700 includes a receiving module 710, a querying module 720, a filtering module 730, and a processing module 740.

The receiving module 710 receives search request strings and reads search terms in the search request strings.

The querying module 720 looks up the search terms in a threshold value dictionary to acquire dynamic threshold scores corresponding to the search terms.

The filtering module 730 regards the search terms as query conditions and the dynamic threshold scores corresponding to the search terms as filter conditions for filtering in an index data table to acquire one or more corresponding pieces of index information when keywords and the search terms are the same and the threshold scores of the keywords are greater than or equal to the dynamic threshold scores of the search terms. In some embodiments, the dynamic threshold scores vary according to characteristic factors.

The processing module 740 acquires the data information corresponding to the search terms based on the index information and sends the data information back to the front-end page of a website for display. The threshold value dictionary includes the search terms and the dynamic threshold score corresponding to each search term, the index data table includes keywords and threshold scores between keywords and each piece of data information, and the characteristic factors include textual characteristic factors and data analysis characteristic factors.

The system described above uses dynamic threshold scores obtained with search terms in a threshold value dictionary as filter conditions for filtering in an index data table. Because the dynamic threshold scores stored in the threshold value dictionary changes dynamically according to real-time updates of the characteristic factors, the acquired data information of the product corresponding to the current search term is dynamically updated due to changes in the dynamic threshold scores. Consequently, the results that are ultimately displayed on the front-end web page of the website are also updated. This system thus achieves real-time, dynamic promotion of product data information.

The present application achieves the following technical results: The dynamic product promotion provided by the present application reduces the coupling between a bid management server 150 platform and a search engine server 130. When a user carries out bid promotion actions through the bid management server 150, the user can know the quality and display status of the promoted products. Dynamic and diversified promotional product information can be presented for different search terms, and the information can vary dynamically according to real-time changes in website flow volumes and promotional information. Such a method helps users to take an initiative in implementing, optimizing, and bidding to promote the beneficial development of business service bidding.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A dynamic data acquisition method, comprising:
   extracting a search term from a search request string that is received;
   looking up the search term in a threshold value dictionary to acquire a dynamic threshold score corresponding to the search term, wherein the dynamic threshold score varies based on characteristic factors, wherein the characteristic factors include a textual characteristic factor for the search term and a data analysis characteristic factor for the search term, the textual characteristic factor and the data analysis characteristic factor being stored in a log dictionary; and wherein the dynamic threshold score relates to a correlation of the search term and a product, wherein the dynamic threshold score is calculated by:
      performing a first fitting calculation based on the textual characteristic factor for the search term to obtain a first threshold score;
      performing a second fitting calculation based on the data analysis characteristic factor for the search term to obtain a second threshold score; and
      performing a third fitting calculation based on the first threshold score and the second threshold score to obtain the dynamic threshold score;
   detecting a change in the characteristic factors, comprising:
      updating the dynamic threshold score based on the changed characteristic factors; and
      storing the updated dynamic threshold score in the threshold value dictionary;
   using the search term as a query condition and the updated dynamic threshold score corresponding to the search term as a filter condition to acquire, in an index data table, one or more corresponding pieces of index information;
   acquiring data information corresponding to the search term based on the index information in the index data table; and
   sending the data information to be displayed in a page of a website.

2. The method as described in claim 1, wherein the using the search term as the query condition and the dynamic threshold score corresponding to the search term as the filter condition to acquire, in the index data table, the one or more corresponding pieces of index information comprises:
   in the event that a keyword that matches the search term exists in the index data table and a threshold score of the keyword in the index data table is greater than or equal to the dynamic threshold score of the search term, acquiring the one or more corresponding pieces of index information.

3. The method as described in claim 1, wherein the threshold value dictionary comprises a plurality of search terms and a corresponding plurality of dynamic threshold scores.

4. The method as described in claim 1, wherein the index data table comprises: a plurality of keywords and a corresponding plurality of threshold scores between the keywords and the data information.

5. The method as described in claim 1, further comprising establishing the threshold value dictionary, including:
  performing a threshold value calculation based on the textual characteristic factor and the data analysis characteristic factor to acquire a dynamic threshold score for each search term; and
  saving the search term and the dynamic threshold score of each search term in a data dictionary format to the threshold value dictionary,
  wherein:
    the textual characteristic factor is a characteristic weight matched to the search term and the data information; and
    the data analysis characteristic factor is an analytic parameter characteristic weight corresponding to the search term.

6. The method as described in claim 5, wherein the performing of the threshold value calculation based on the textual characteristic factor and the data analysis characteristic factor to acquire the dynamic threshold score for each search term comprises:
  employing a linear regression model, $Score_0 = F0(f_1, f_2, \ldots, fi)$, to perform a fitting calculation and to acquire a first threshold score, $Score_0$, for the search term, wherein fi is a textual characteristic factor corresponding to the search term, i is an integer less than or equal to N, and N is a natural number;
  employing a linear regression model, $Score_1 = F1(f'_1, \ldots, f'_k)$, to perform fitting calculations and to acquire a second threshold score, $Score_1$, for the search term, wherein $f'_k$ is a data analysis characteristic factor corresponding to the search term, k is an integer less than or equal to M, and M is a natural number; and
  performing a fitting calculation based on the linear regression model $Score = F(score_0, score_1) \times p_1 \times p_2$ to acquire the dynamic threshold score for the search term, wherein $p_1$ is a duty cycle of the first threshold score and $p_2$ is a duty cycle of the second threshold score.

7. The method as described in claim 1, further comprising:
  establishing the index data table, comprising:
    acquiring a keyword and a textual characteristic factor of each piece of the data information bound to the keyword from a bid management server or a log dictionary;
    performing a threshold value calculation based on the textual characteristic factor to acquire one or more threshold scores corresponding to each keyword;
    saving the keywords and the one or more threshold scores corresponding to each keyword to a threshold value database; and
    creating the index data table based on keywords in the threshold value database and the corresponding one or more threshold scores,
    wherein the performing of the threshold value calculation based on the textual characteristic factor to acquire the one or more threshold scores corresponding to each keyword comprises: employing a linear regression model, $Score' = F'(f1, f2, \ldots, fj)$, to perform a fitting calculation and to acquire a threshold score for the keyword, wherein fj is the textual characteristic factor corresponding to the keyword, j is an integer less than or equal to J, and J is a natural number.

8. A dynamic data acquiring system, comprising:
  at least one processor configured to:
    extract a search term from a search request string that is received;
    look up the search term in a threshold value dictionary to acquire a dynamic threshold score corresponding to the search term, wherein the dynamic threshold score varies based on characteristic factors, wherein the characteristic factors include a textual characteristic factor for the search term and a data analysis characteristic factor for the search term, the textual characteristic factor and the data analysis characteristic factor being stored in a log dictionary; and
    wherein the dynamic threshold score relates to a correlation of the search term and a product, wherein the dynamic threshold score is calculated by:
      performing a first fitting calculation based on the textual characteristic factor for the search term to obtain a first threshold score;
      performing a second fitting calculation based on the data analysis characteristic factor for the search term to obtain a second threshold score; and
      performing a third fitting calculation based on the first threshold score and the second threshold score to obtain the dynamic threshold score;
    detect a change in the characteristic factors, comprising to:
      update the dynamic threshold score based on the changed characteristic factors; and
      store the updated dynamic threshold score in the threshold value dictionary;
    use the search term as a query condition and the updated dynamic threshold score corresponding to the search term as a filter condition to acquire, in an index data table, one or more corresponding pieces of index information;
    acquire data information corresponding to the search term based on the index information in the index data table; and
    send the data information to be displayed in a page of a web site; and
  a memory coupled to the at least one processor and configured to provide the at least one processor with instructions.

9. The system as described in claim 8, wherein the use the search term as the query condition and the dynamic threshold score corresponding to the search term as the filter condition to acquire, in the index data table, the one or more corresponding pieces of index information comprises:
  in the event that a keyword that matches the search term exists in the index data table and a threshold score of the keyword in the index data table is greater than or equal to the dynamic threshold score of the search term, acquire the one or more corresponding pieces of index information.

10. The system as described in claim 8, wherein the threshold value dictionary comprises a plurality of search terms and a corresponding plurality of dynamic threshold scores.

11. The system as described in claim 8, wherein the index data table comprises: a plurality of keywords and a corresponding plurality of threshold scores between the keywords and the data information.

12. The system as described in claim 8, wherein the at least one processor is further configured to:
  establish the threshold value dictionary, including:
    perform a threshold value calculation based on the textual characteristic factor and the data analysis characteristic factor to acquire a dynamic threshold score for each search term; and
    save the search term and the dynamic threshold score of each search term in a data dictionary format to the threshold value dictionary,
  wherein:
    the textual characteristic factor is a characteristic weight matched to the search term and the data information; and
    the data analysis characteristic factor is an analytic parameter characteristic weight corresponding to the search term.

13. The system as described in claim 12, wherein the performing of the threshold value calculation based on the textual characteristic factor and the data analysis characteristic factor to acquire the dynamic threshold score for each search term comprises:
  employ a linear regression model, $Score_0 = F0(f_1, f_2, \ldots, f_i)$, to perform a fitting calculation and to acquire a first threshold score, $Score_0$, for the search term, wherein fi is a textual characteristic factor corresponding to the search term, i is an integer less than or equal to N, and N is a natural number;
  employ a linear regression model, $Score_1 = F1(f'_1, \ldots f'_k)$, to perform fitting calculations and to acquire a second threshold score, $Score_1$, for the search term, wherein $f'_k$ is a data analysis characteristic factor corresponding to the search term, k is an integer less than or equal to M, and M is a natural number; and
  perform a fitting calculation based on the linear regression model $Score = F(score_0, score_1,) \times p_1 \times p_2$ to acquire the dynamic threshold score for the search term, wherein $p_1$ is a duty cycle of the first threshold score and $p_2$ is a duty cycle of the second threshold score.

14. The system as described in claim 8, wherein the at least one processor is further configured to:
  establish the index data table, comprising:
    acquire a keyword and a textual characteristic factor of each piece of the data information bound to the keyword from a bid management server or a log dictionary;
    perform a threshold value calculation based on the textual characteristic factor to acquire one or more threshold scores corresponding to each keyword;
    save the keywords and the one or more threshold scores corresponding to each keyword to a threshold value database.

15. The system as described in claim 14, wherein the performing of the threshold value calculation based on the textual characteristic factor to acquire the one or more threshold scores corresponding to each keyword comprises: employing a linear regression model, $Score' = F'(f1, f2, \ldots fj)$, to perform a fitting calculation and to acquire a threshold score for the keyword, wherein fj is the textual characteristic factor corresponding to the keyword, j is an integer less than or equal to J, and J is a natural number.

16. A computer program product for dynamically acquiring data, the computer program product being embodied in a tangible non-transitory computer readable storage medium and comprising computer instructions for:
  extracting a search term from a search request string that is received;
  looking up the search term in a threshold value dictionary to acquire a dynamic threshold score corresponding to the search term, wherein the dynamic threshold score varies based on characteristic factors, wherein the characteristic factors include a textual characteristic factor for the search term and a data analysis characteristic factor for the search term, the textual characteristic factor and the data analysis characteristic factor being stored in a log dictionary; and wherein the dynamic threshold score relates to a correlation of the search term and a product, wherein the dynamic threshold score is calculated by:
    performing a first fitting calculation based on the textual characteristic factor for the search term to obtain a first threshold score;
    performing a second fitting calculation based on the data analysis characteristic factor for the search term to obtain a second threshold score; and
    performing a third fitting calculation based on the first threshold score and the second threshold score to obtain the dynamic threshold score; detecting a change in the characteristic factors, comprising:
    updating the dynamic threshold score based on the changed characteristic factors; and
    storing the updated dynamic threshold score in the threshold value dictionary;
  using the search term as a query condition and the updated dynamic threshold score corresponding to the search term as a filter condition to acquire, in an index data table, one or more corresponding pieces of index information;
  acquiring data information corresponding to the search term based on the index information in the index data table; and
  sending the data information to be displayed in a page of a website.

17. The method as described in claim 1, further comprising:
  receiving a real-time message to monitor consistency of a log dictionary, the log dictionary including characteristic factors for corresponding search terms, wherein the monitoring of the consistency of the log dictionary comprises:
    determining whether at least one characteristic factor has changed; and
    in the event that the at least one characteristic factor has changed, updating the log dictionary, comprising:
      recalculating at least one dynamic threshold score based at least in part on the at least one changed characteristic factor; and
      storing the at least one recalculated dynamic threshold score in the threshold value dictionary.

18. The method as described in claim 1, wherein the textual characteristic factor includes textual information matching parameters for search terms, products, or both.

19. The method as described in claim 1, wherein the data analysis characteristic factor includes click rates of search terms, click rates of various corresponding products, popularity of search terms, user promoted product area information, search term-bound product numbers, user numbers, or any combination thereof.

* * * * *

UNITED STATES PATENT AND TRADEMARK OFFICE
CERTIFICATE OF CORRECTION

PATENT NO. : 10,025,807 B2
APPLICATION NO. : 14/022634
DATED : July 17, 2018
INVENTOR(S) : Zhang et al.

It is certified that error appears in the above-identified patent and that said Letters Patent is hereby corrected as shown below:

In the Claims

In Column 19, Claim 13, Line 36, delete "Score=$F(score_0,score_1,)xp_1xp_2$" and insert --Score=$F(score_0,score_1)xp_1xp_2$--, therefor.

Signed and Sealed this
Twentieth Day of November, 2018

Andrei Iancu
*Director of the United States Patent and Trademark Office*